(12) United States Patent  (10) Patent No.: US 8,826,284 B1
Fuller  (45) Date of Patent: Sep. 2, 2014

(54) SCALABLE TASK SCHEDULING

(75) Inventor: Alfred R. K. Fuller, San Carlos, CA (US)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 13/431,908

(22) Filed: Mar. 27, 2012

Related U.S. Application Data

(60) Provisional application No. 61/553,899, filed on Oct. 31, 2011.

(51) Int. Cl.
*G06F 9/46* (2006.01)

(52) U.S. Cl.
USPC .......................... 718/102; 718/100; 718/103

(58) Field of Classification Search
CPC ........ G06F 9/4881; G06F 9/4843; G06F 9/52
See application file for complete search history.

(56) References Cited

U.S. PATENT DOCUMENTS

| | | | |
|---|---|---|---|
| 4,325,120 A * | 4/1982 | Colley et al. | 711/202 |
| 4,779,194 A * | 10/1988 | Jennings et al. | 718/106 |
| 4,796,178 A * | 1/1989 | Jennings et al. | 718/103 |
| 5,381,546 A * | 1/1995 | Servi et al. | 718/102 |
| 5,560,007 A | 9/1996 | Thai | |
| 5,745,890 A | 4/1998 | Burrows | |
| 6,105,019 A | 8/2000 | Burrows | |
| 6,289,334 B1 | 9/2001 | Reiner et al. | |
| 6,341,302 B1 * | 1/2002 | Celis | 718/100 |
| 6,963,869 B2 | 11/2005 | Burrows | |
| 7,043,469 B2 | 5/2006 | Goralwalla et al. | |
| 7,058,949 B1 * | 6/2006 | Willen et al. | 718/104 |
| 7,155,716 B2 * | 12/2006 | Hooman et al. | 718/102 |
| 7,243,351 B2 * | 7/2007 | Kundu | 718/102 |
| 7,246,353 B2 * | 7/2007 | Forin et al. | 718/100 |
| 7,406,460 B2 | 7/2008 | Burrows | |
| 7,467,163 B1 | 12/2008 | Dodds et al. | |
| 7,516,456 B2 * | 4/2009 | Aguilar et al. | 718/102 |
| 7,689,550 B2 | 3/2010 | Lee et al. | |
| 8,099,422 B2 | 1/2012 | De Bellis | |
| 8,185,899 B2 * | 5/2012 | Daly et al. | 718/102 |
| 8,560,509 B2 | 10/2013 | Xia et al. | |
| 8,635,621 B2 * | 1/2014 | Levitan et al. | 718/103 |
| 2003/0140035 A1 | 7/2003 | Burrows | |
| 2004/0167904 A1 | 8/2004 | Wen et al. | |

(Continued)

OTHER PUBLICATIONS

Ben-Gan, Descending Indexes, Index Ordering, Parallelism, and Ranking Calculations, SQL Server Pro, May 24, 2010, 7 pgs.

(Continued)

*Primary Examiner* — Van Nguyen

(74) *Attorney, Agent, or Firm* — Morgan, Lewis & Bockius LLP

(57) ABSTRACT

A server system having one or more processors and memory receives, from a client, a request to perform a first task. The server system determines whether a first slot in a primary task queue having a plurality of slots is available, where the first slot was selected in accordance with a slot-selection function designed to probabilistically distribute respective target slots for a plurality of successive tasks across a plurality of different non-consecutive slots in the primary task queue. In accordance with a determination that the first slot is available, the server system inserts the first task in the first slot in the primary task queue. In accordance with a determination that the first slot is unavailable, the server system inserts the first task at an entry point of a secondary task queue.

29 Claims, 11 Drawing Sheets

(56) References Cited

U.S. PATENT DOCUMENTS

| | | |
|---|---|---|
| 2004/0243569 A1 | 12/2004 | Burrows |
| 2005/0055355 A1 | 3/2005 | Murthy et al. |
| 2005/0228792 A1 | 10/2005 | Chandrasekaran et al. |
| 2006/0031811 A1 | 2/2006 | Ernst et al. |
| 2006/0271556 A1 | 11/2006 | Mukherjee et al. |
| 2010/0042602 A1 | 2/2010 | Smyros et al. |
| 2011/0119249 A1 | 5/2011 | Flatz et al. |
| 2011/0225167 A1 | 9/2011 | Bhattacharjee et al. |
| 2011/0246498 A1 | 10/2011 | Forster |
| 2013/0097608 A1* | 4/2013 | Kessler et al. ............... 718/104 |
| 2013/0282765 A1 | 10/2013 | Bhattacharjee et al. |

OTHER PUBLICATIONS

Decipherinfosys, Column Order in a Composite Index, Systems Engineering and RDBMS, May 13, 2008, 4 pgs.
Quassnoi, Explain Extended, Descending Indexes, Apr. 27, 2009, 8 pgs.
Scharlock, Designing Composite Indexes, Sep. 26, 2008, 5 pgs.
PostgreSQL, PostgreSQL 8.1.3 Documentation, Internet Archive Wayback Machine, May 4, 2006, 1 page.

* cited by examiner

SCALABLE TASK SCHEDULING

RELATED APPLICATIONS

This application claims priority to U.S. Provisional Application Ser. No. 61/553,899, filed Oct. 31, 2011, entitled "Scalable Task Scheduling," which is incorporated by reference herein in its entirety.

FIELD OF THE INVENTION

The present invention relates generally to the field of distributed client-server computer network systems, and in particular, to a system and method for scheduling tasks in a scalable manner.

BACKGROUND OF THE INVENTION

Servers in distributed computer systems are frequently relied on to schedule tasks for processing requests from a large number of clients. However, in situations where there are a large number of tasks to be performed, a server can quickly become overwhelmed by the process of scheduling the tasks for execution. Conventional approaches to task scheduling can result in substantial wasted resources either because too many resources are dedicated to a small number of tasks or because not enough resources are dedicated to a large number of tasks. Indeed, the same server may face both of these problems sequentially or in parallel due to the fact that the rate at which requests are received from clients can vary dramatically over a typical operational time period. Moreover, a server that is inefficient or overwhelmed can become a bottleneck for task processing and consequently increase the latency of responses to the client requests. These and other problems with conventional approaches to task scheduling are reduced or eliminated by the systems and methods described below.

SUMMARY

It would be advantageous to provide a system and method for scalably and efficiently scheduling tasks in a manner that avoids bottlenecks and reduces latency for responses to client requests. In particular, an approach that enabled tasks to be assigned to a primary task queue where slots in the primary task queue are dynamically assigned to one or more worker processes in accordance with the workload of the worker processes would enable computing resources to be allocated to the tasks in an efficient and flexible manner.

In some embodiments, a method is performed at a server system having one or more processors and memory storing one or more programs for execution by the one or more processors so as to perform the method. The method includes receiving, from a client, a request to perform a first task and determining whether a first slot in a primary task queue having a plurality of slots is available. The first slot is selected in accordance with a slot-selection function designed to probabilistically distribute respective target slots for a plurality of successive tasks across a plurality of different non-consecutive slots in the primary task queue. The method further comprises, in accordance with a determination that the first slot is available, inserting the first task in the first slot in the primary task queue and, in accordance with a determination that the first slot is unavailable, inserting the first task at an entry point of a secondary task queue.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the methods described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The present invention is directed to a client-server system and corresponding method of scheduling tasks in a scalable and efficient manner.

Figure 1:
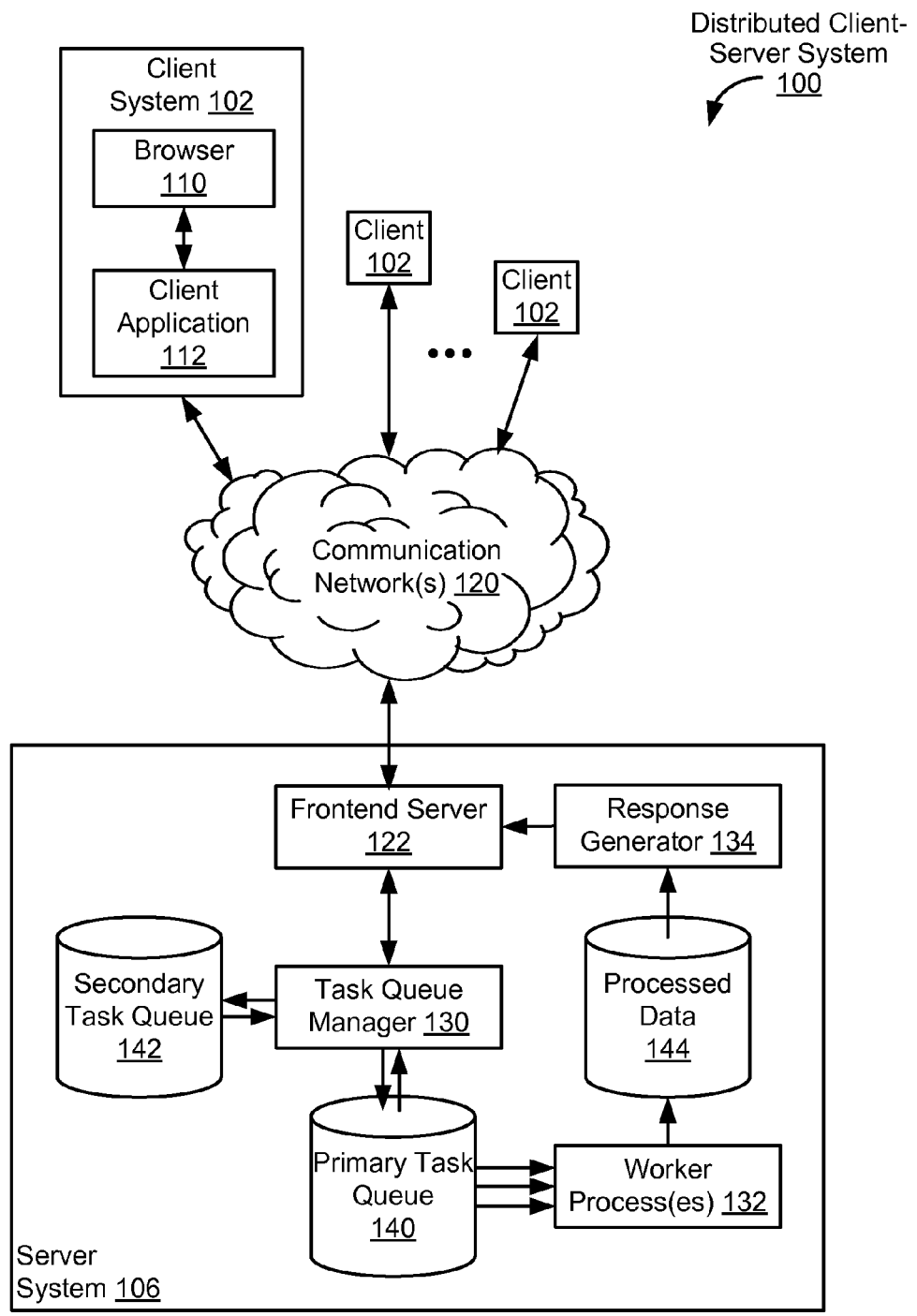
FIG. 1 is a block diagram illustrating a distributed client-server system, in accordance with some embodiments.

FIG. 1 includes a block diagram illustrating an exemplary distributed client-server system 100 for scheduling tasks. System 100 includes one or more Client System(s) 102 (also referred to herein as "Client 102"), a Server System 106 (also referred to herein as "Server 106") and a Communication Network 120 for connecting Client System(s) 102 to Server System 106. Communication Network 120 optionally includes the Internet, one or more local area networks (LANs), one or more wide area networks (WANs), other types networks, or a combination of such networks.

A Client 102 optionally includes a Browser 110 and a Client Application 112. Browser 110 can be a general purpose Internet browser (sometimes called a Web browser) having a browser window used for displaying a web application that generates tasks for execution by Server 106. A web application user interface is optionally rendered by Browser 110 using hypertext markup language (HTML) or any other appropriate rendering methodology. Alternatively, a stand alone Client Application 112 generates tasks for execution by Server 106. In some embodiments Client 102 is an end-user device (e.g., a smartphone, tablet computer, personal computer, etc.). In other embodiments Client 102 is a server that is running one or more applications that generate tasks for execution by Server 106. After a user performs an operation at Browser 110 or a stand-alone Client Application 112, Client 102 relays a request to perform a task corresponding to the operation to Server 106 via Communication Network 120. Server 106 performs the task, generates a response to the task and sends the response back to Client 102. Client Application 112 and/or Browser 110 uses the response to render an updated application state at Client 102.

Server System 106 includes Frontend Server 122, Task Queue Manager 130, one or more Worker Processes 132; Response Generator 134; Primary Task Queue 140; Secondary Task Queue 142; and Processed Data 144. Task Queue Manager 130 manages the assignment of tasks to Primary Task Queue 140 and Secondary Task Queue 142 and the assignment of respective portions of Primary Task Queue 140 to respective Worker Processes 132. In particular, for a particular task, Task Queue Manager 130 attempts to place the particular task in a slot in Primary Task Queue 140 and if the slot is occupied, places the particular task in Secondary Task Queue 142 instead. When the particular task reaches an exit point of Secondary Task Queue 142, Task Queue Manager 130 attempts to place the particular task in a slot in Primary Task Queue 140 again. After a Worker Process 132 has been assigned to a respective portion of Primary Task Queue 140, the Worker Process 132 executes tasks from the respective portion of Primary Task Queue 140 to generate Processed Data 144 and removes completed tasks from the respective portion of Primary Task Queue 140.

Thus, when Client 102 sends a request to Server 106, Frontend Server 122 receives the request and forwards it to Task Queue Manager 130, which places the task in Primary Queue 140. The task is retrieved from Primary Task Queue 140 by a Worker Process 132, which performs the task and deletes the task from Primary Task Queue 140 and stores a result of processing the task as Processed Data 144. Processed Data 144 corresponding to the task is used by a Response Generator 134 to generate a response to the request and Frontend Server 122, passes the response to Client 102 (i.e., to the requesting Client 102 which submitted the request to Server 106) via Communication Network 120 for display at Client 102 (e.g., via Browser 110 or Client Application 112).

Figure 2:
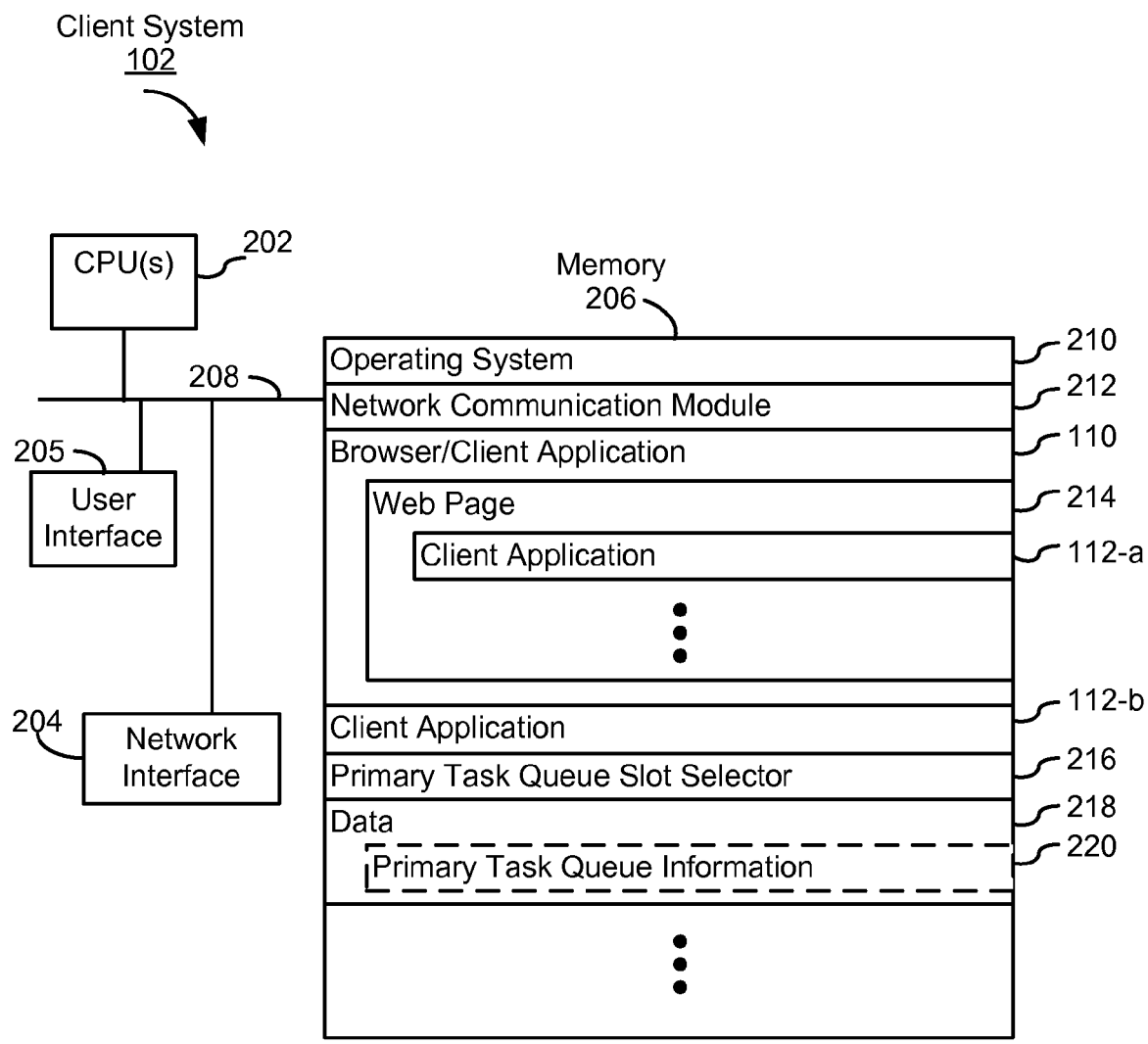
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212 that is used for connecting Client 102 to other computers (e.g., Server 106) via one or more Network Interfaces 204 (wired or wireless) and one or more Communication Networks 120 (FIG. 1), such as the Internet, other wide area networks, local area networks, metropolitan area networks, and so on;

Web Browser 110 for loading Web Page 214, which optionally includes the code for a Client Application 112-a, sometimes called an embedded web application; execution of Client Application 112-a by Client 102 causes Client 102 to send requests to Server 106 and to display information corresponding to responses received from Server 106;

dedicated Client Application 112-b (e.g., a stand-alone email client) for sending requests to Server 106 and displaying information corresponding to responses received from Server 106;

optionally, Primary Task Queue Slot Selector 216 for determining a preliminary slot assignment for a task in Primary Task Queue 140 at Server 106 (e.g., using a slot-selection function); the preliminary slot assignment determined at Client 102 is, in some implementations, sent to Server 106 in a request including a task to be performed/executed by Server 106; and optionally, Data 216 such as cached application data (e.g., recently accessed search results, recent search queries, etc.), and optionally Primary Task Queue Information 220 (e.g., a slot-count value for the slots in Primary Task Queue 140, FIG. 1) that is used by Primary Task Queue Slot Selector 216 (or a slot-selection function executed by Primary Task Queue Slot Selector 216) to determine a preliminary slot assignment for a task.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
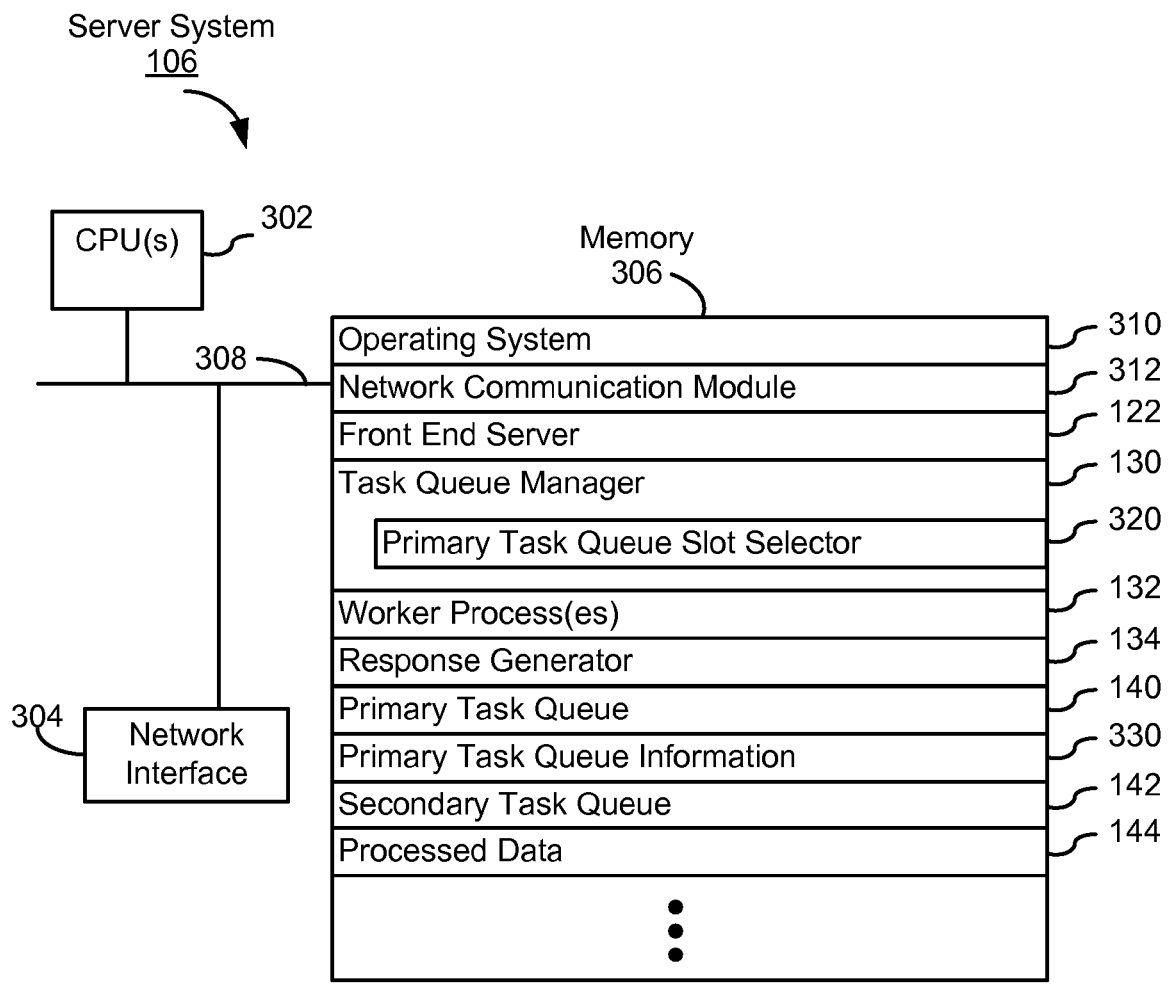
FIG. 3 is a block diagram illustrating a server system, in accordance with some embodiments.

FIG. 3 is a block diagram illustrating a Server System 106 in accordance with some embodiments. Server System 106 typically includes one or more processing units CPU(s) 302, one or more network or other Communications Interfaces 308, Memory 306, and one or more Communication Buses 308 for interconnecting these components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312 that is used for connecting Server 106 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;
- Frontend Server 122 for coordinating communication between Server 106, Clients 102 and any other computer systems with which Server 106 communicates;
- Task Queue Manager 130 for placing tasks in Primary Task Queue 140 and Secondary Task Queue 142 and for assigning Worker Processors 132 to tasks in Primary Task Queue 140; in some embodiments, Task Queue Manager 130 places tasks in Primary Task Queue 140 using Primary Task Queue Slot Selector 320 which determines candidate slots for tasks in Primary Task Queue 140; in some implementations the candidate slots are determined using a slot-selection function that is based at least in part on Primary Task Queue Information 330;
- one or more Worker Processes 132 for processing tasks in Primary Task Queue 140 to generate Processed Data 144; in some embodiments each of the Worker Processes corresponds to a separate server, processor, or process within a server in Server System 106;
- Response Generator 134 for generating responses to requests from Client 102 based on Processed Data 144;
- Primary Task Queue 140 for storing tasks that are ready to be processed by a Worker Process 132; in some embodiments Primary Task Queue 140 can be divided into two or more portions, each portion being stored in a storage device, where a respective Worker Process 132 is assigned to a respective range of slots in Primary Queue 140 and is informed which storage device (or is otherwise provided access to the storage device that) stores the respective slots in Primary Queue 140 to which the respective Worker Process 132 has been assigned;
- Primary Task Queue Information 330 (e.g., a slot-count value corresponding to a number of slots in Primary Task Queue 140) for use by Primary Task Queue Slot Selector 320 to determine candidate slots in Primary Task Queue 140 for incoming requests;
- Secondary Task Queue 142 for storing tasks that have not yet been placed in Primary Task Queue 140 (e.g., tasks that could not be placed into their respective candidate slots in Primary Task Queue 140); and
- Processed Data 144 corresponding to tasks processed by Worker Processes 132 for use by Result Generator 134 to generate responses to requests from Client 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows a "Server System" 106 FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 106 and how features are allocated among them will vary from one implementation to another, and optionally depends in part on the amount of data traffic that the system must handle during peak usage periods as well as during average usage periods.

Task Queues

Figure 4A:
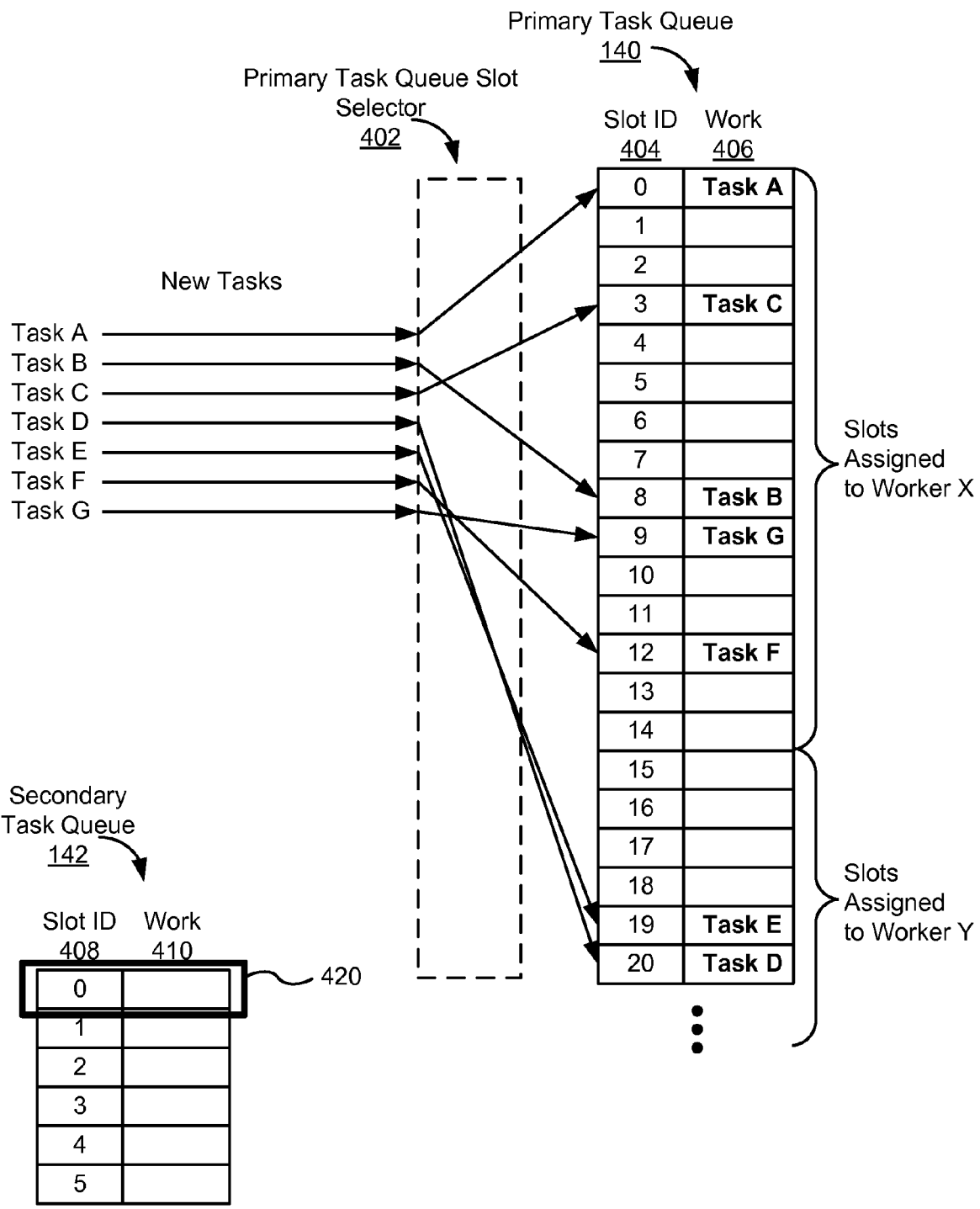
FIGS. 4A-4E are block diagrams illustrating the insertion of tasks in a primary task queue for assignment to one or more worker processes, in accordance with some embodiments.

FIGS. 4A-4E illustrate the insertion of tasks in a primary task queue for assignment to one or more worker processes, in accordance with some embodiments. FIG. 4A includes a representation of Primary Task queue 140 having a plurality of slots each including a respective Slot ID 404 and optionally, associated Work 404. FIG. 4A also includes a Secondary Task Queue 142 having a plurality of slots each including a respective Slot ID 408 and optionally, associated Work 410. Secondary Task Queue 142 in this example is a circular queue, where an exit portion 420 of Secondary Task Queue 142 is the portion that is processed next (e.g., the next task that Server 106 or Task Queue Manager 130 of Server 106 attempts to move from Secondary Task Queue 142 to Primary Task Queue 140). Additionally, in the example shown in FIG. 4A, Worker X is assigned to slots 0-14 of Primary Task Queue 140 and Worker Y is assigned to slots 15-20 of Primary Task Queue. It should be understood that these assignments may be changed dynamically while new tasks are being received and assigned to slots in Primary Task Queue 140 and processed by various worker processes.

Figure 5A:
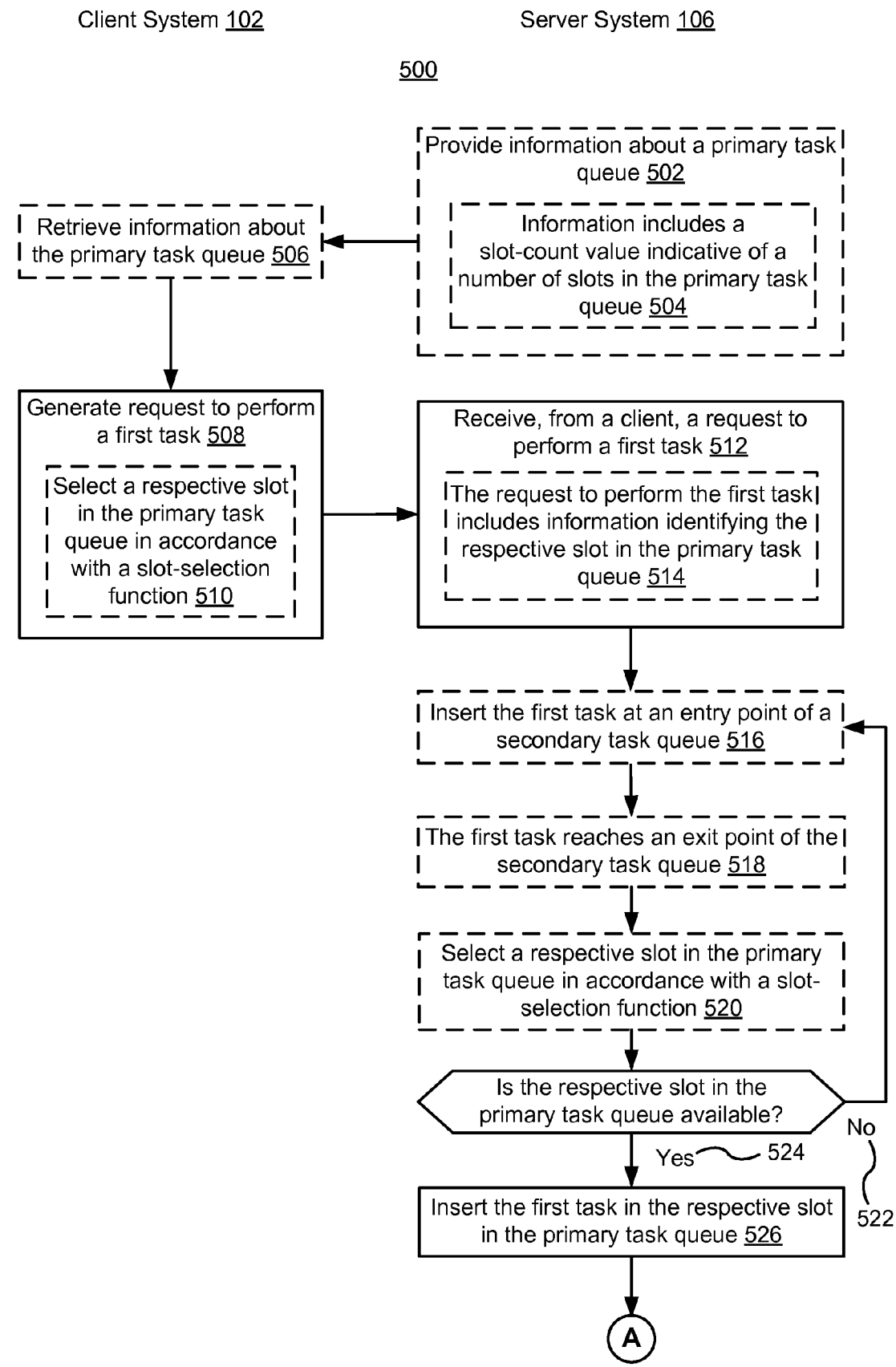
FIGS. 5A-5C include a flow chart illustrating a method for assigning tasks to worker processes in a scalable and efficient manner using a primary task queue, in accordance with some embodiments.
Figure 5B:
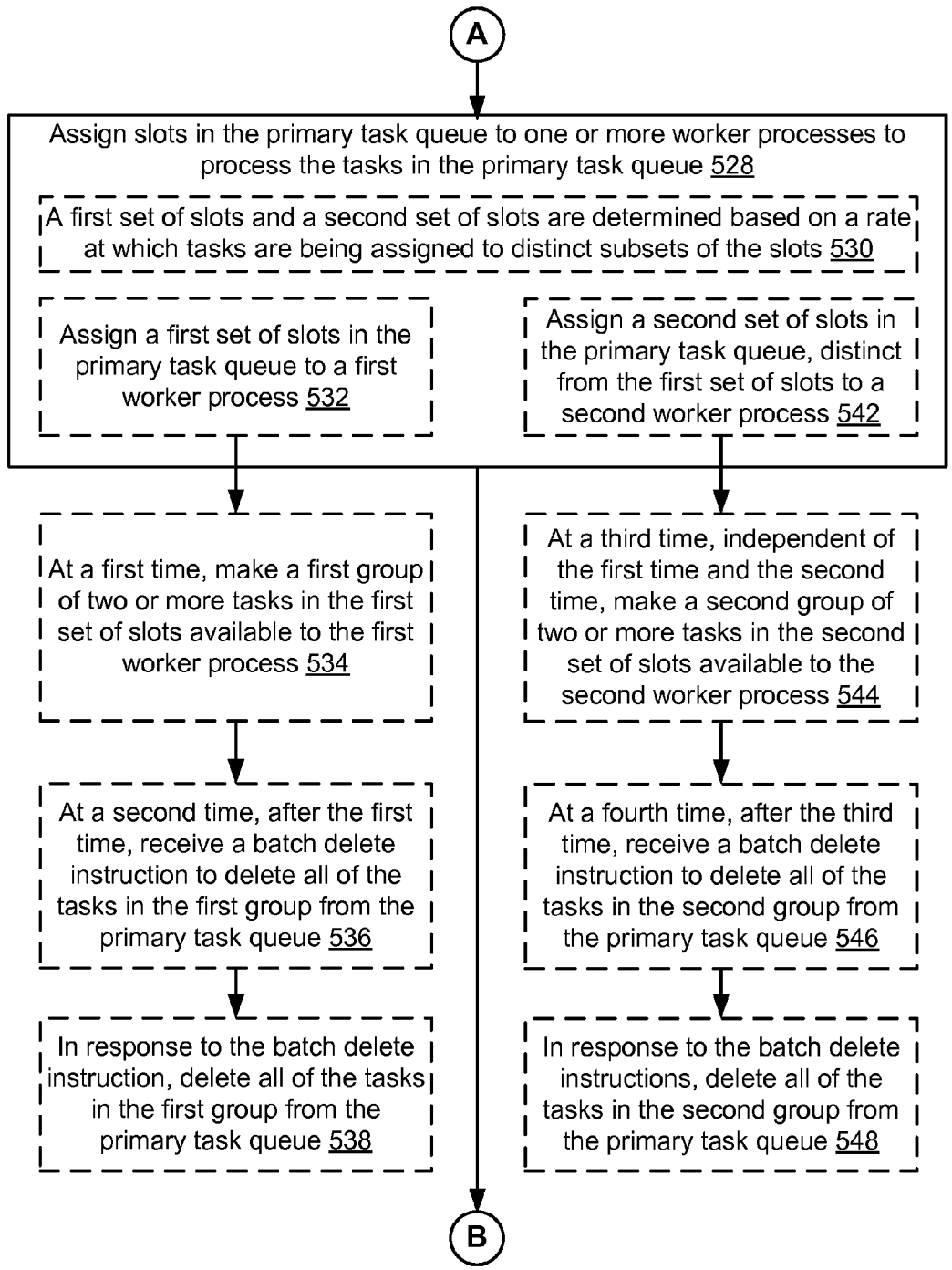
Figure 5C:
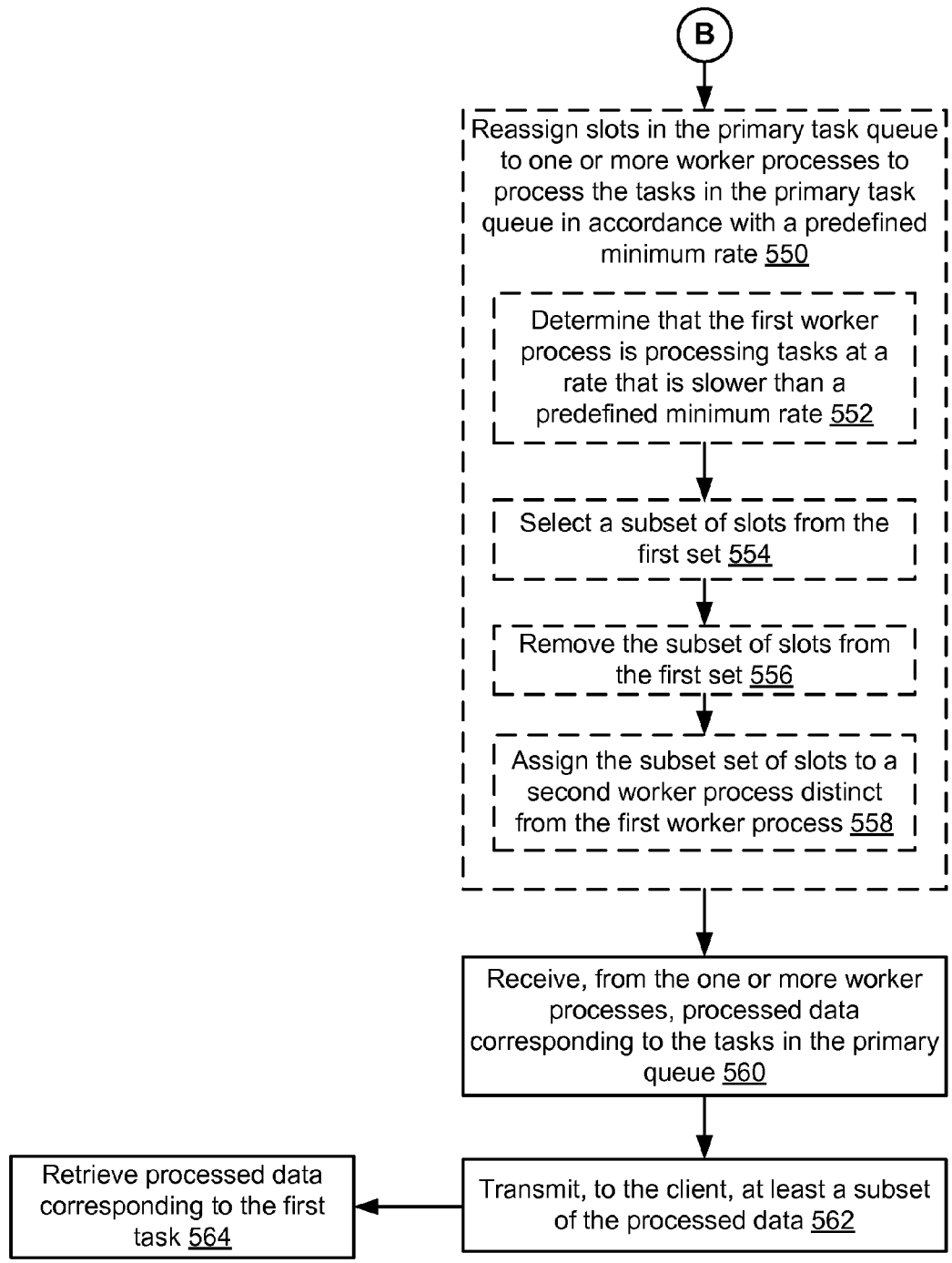

In the example illustrated in FIG. 4A, for simplicity, both Primary Task Queue 140 and Secondary Task Queue 142 are initially shown as being empty. New tasks A-G are to be scheduled for processing, and a candidate slot for each of the new tasks is selected by a Primary Task Queue Slot Selector 402. As described in greater detail below with reference to FIGS. 5A-5C, the determination of initial candidate slots for new tasks may be performed either at Client 102 or Server 106. Thus, Primary Task Queue Slot Selector could include either client-side Primary Task Queue Slot Selector 216 or server-side Primary Task Queue Slot Selector 320, or both. In the example illustrated in FIG. 4A, there are no existing tasks in Primary Task Queue 140 and thus all of the slots in Primary Task Queue 140 are empty. Consequently all of the new tasks (e.g., tasks A-G) can be successfully placed in the initial candidate slots. In FIG. 4A, there are also no tasks in Secondary Task Queue 142, and thus no tasks are moved from Secondary Task Queue 142 to Primary Task Queue 140.

Figure 4B:
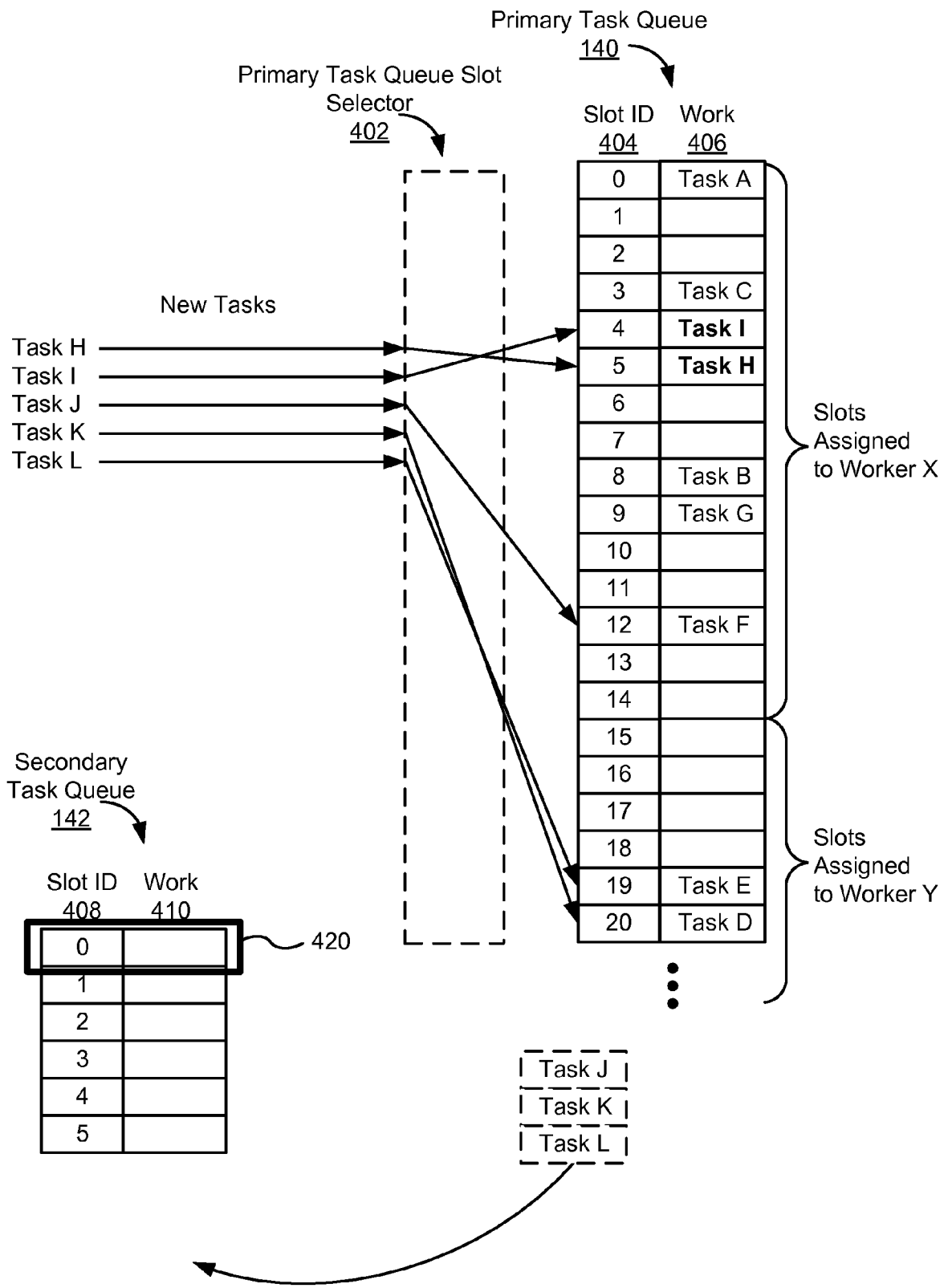

In FIG. 4B tasks A-G are still present in Primary Task Queue 140 as they have not yet been retrieved for processing by Worker X and/or Worker Y. New tasks H-L are to be scheduled for processing, and a candidate slot for each of the new tasks is selected by Primary Task Queue Slot Selector 402. In the example illustrated in FIG. 4B, some of the slots in Primary Task Queue 140 are now occupied with tasks A-G while other slots are empty. New tasks (e.g., tasks H and I) that are assigned candidate slots (e.g., slots 5 and 4, respectively) that are unoccupied are placed in the candidate slots. In contrast, new tasks (e.g., tasks J, K and L) that are assigned candidate slots (e.g., slots 12, 20 and 19, respectively) that are currently occupied (e.g., by tasks F, D and E, respectively) are redirected to Secondary Task Queue 142.

Figure 4C:
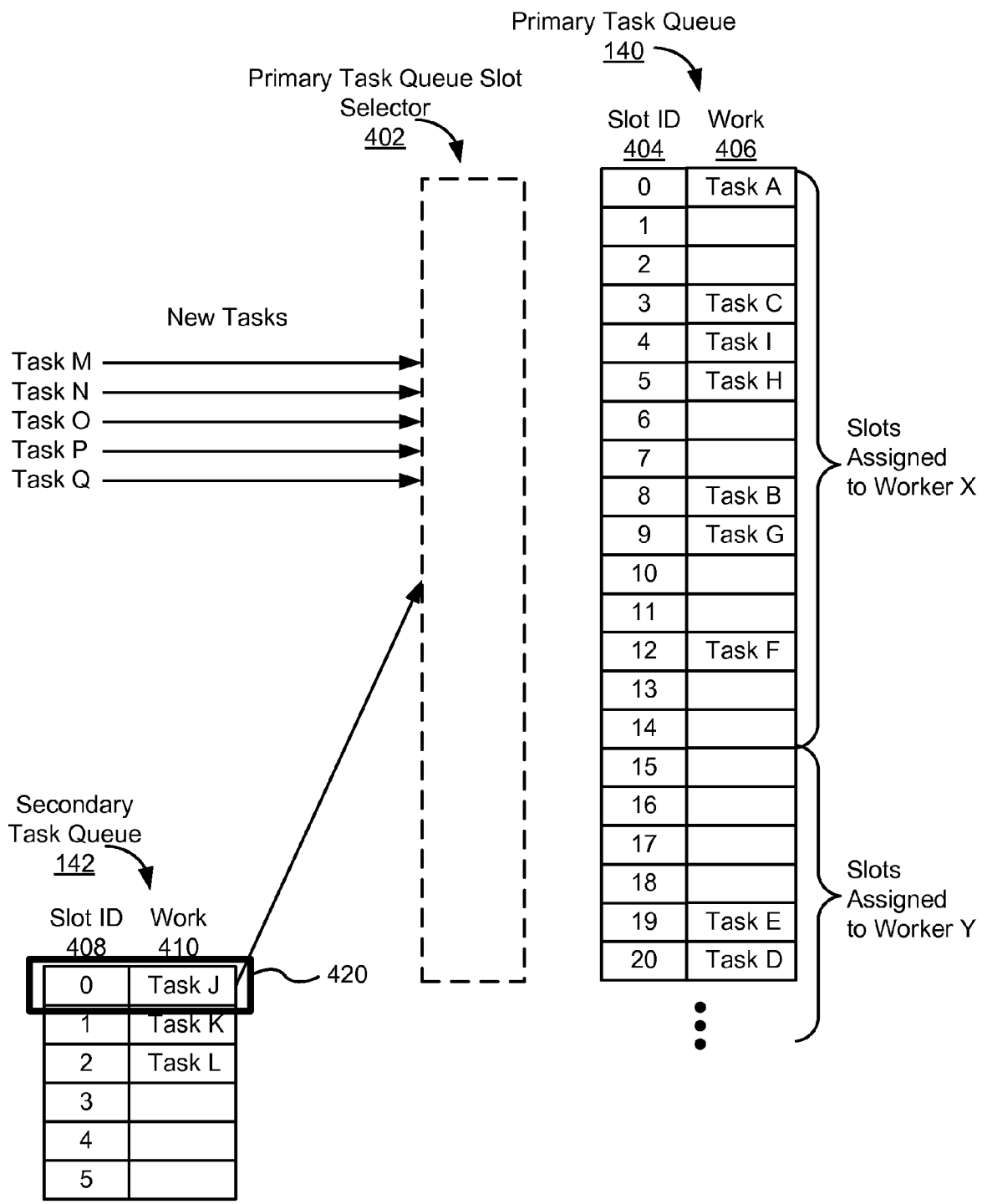

In FIG. 4C tasks A-I are still present in Primary Task Queue 140 as they have not yet been retrieved for processing by Worker X and/or Worker Y. New tasks M-Q are to be scheduled for processing. Additionally, in the example illustrated in FIG. 4C, some of the slots in Secondary Task Queue 142 are now occupied with tasks J-L, and thus Server 106 attempts to place one or more of these tasks (e.g., task J in exit portion 420 of Secondary Task Queue 142) into Primary Task Queue 140 via Primary Task Queue Slot Selector 402.

Figure 4D:
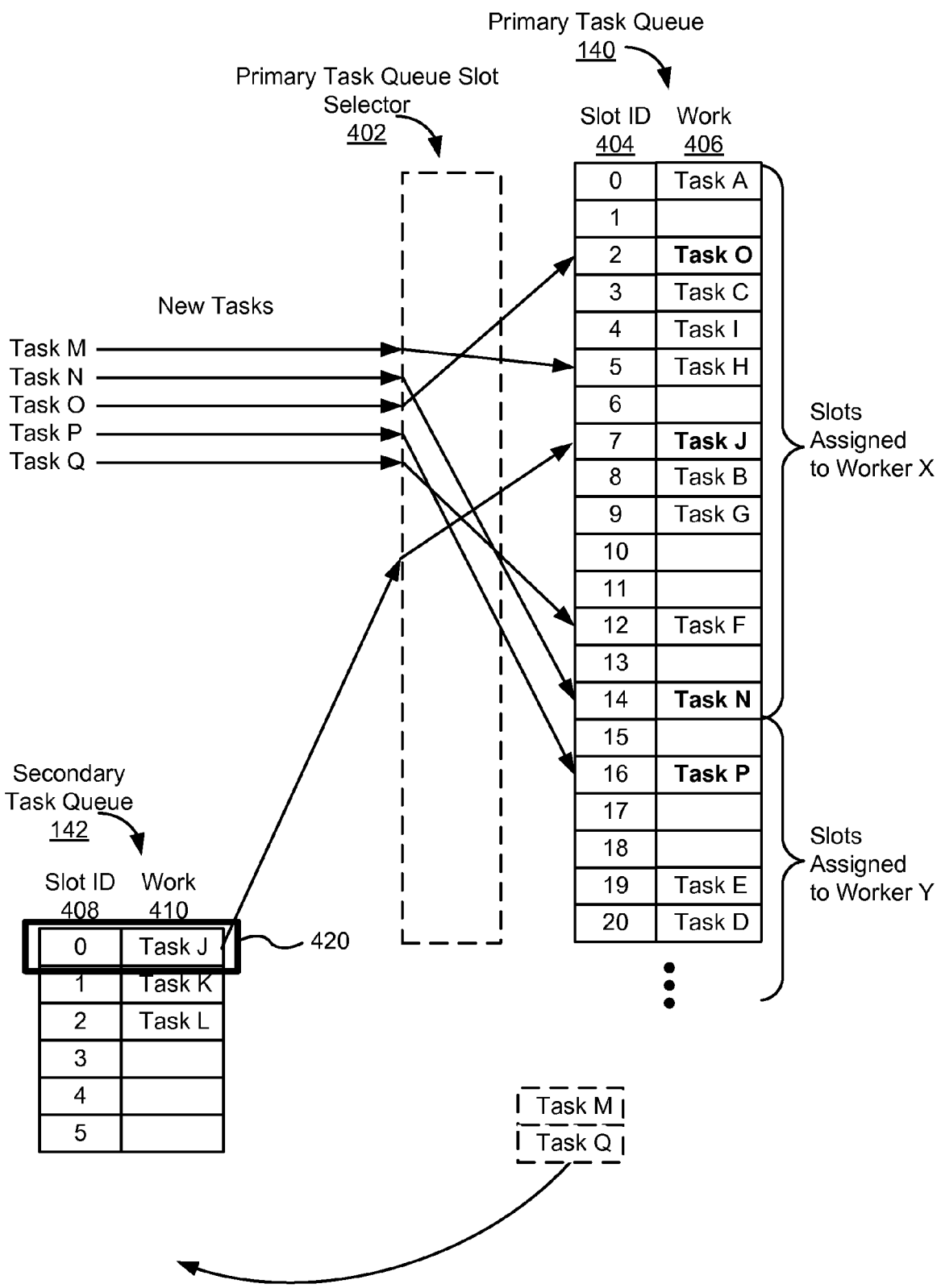

In FIG. 4D tasks A-I are still present in Primary Task Queue 140 as they have not yet been retrieved for processing by Worker X and/or Worker Y. New tasks M-Q are to be scheduled for processing, and a candidate slot for each of the new tasks is selected by Primary Task Queue Slot Selector 402. Additionally, a candidate slot for one or more of the tasks from Secondary Task Queue 142 is also selected by Primary Task Queue Slot Selector 402. In the example illustrated in FIG. 4D, some of the slots in Primary Task Queue 140 are occupied with tasks A-I while other slots are empty. New tasks (e.g., tasks N, O and P) and that are assigned candidate slots (e.g., slots 14, 2 and 16, respectively) that are unoccupied are placed in the candidate slots. In contrast, new tasks (e.g., tasks M and Q) that are assigned candidate slots (e.g., slots 5 and 12, respectively) that are currently occupied (e.g., by tasks H and F, respectively) are redirected to Secondary Task Queue 142. Additionally task J, which was previously redirected to Secondary Task Queue 142, is assigned a new candidate slot (e.g., slot 7) that is unoccupied, and thus is successfully placed in Primary Task Queue 140 in the unoccupied candidate slot. However it should be understood that if the new candidate slot assigned to task J had been an occupied slot in Primary Task Queue 140, task J would have been left in or returned to Secondary Task Queue 142 (depending on the implementation of the Secondary Task Queue 142).

Figure 4E:
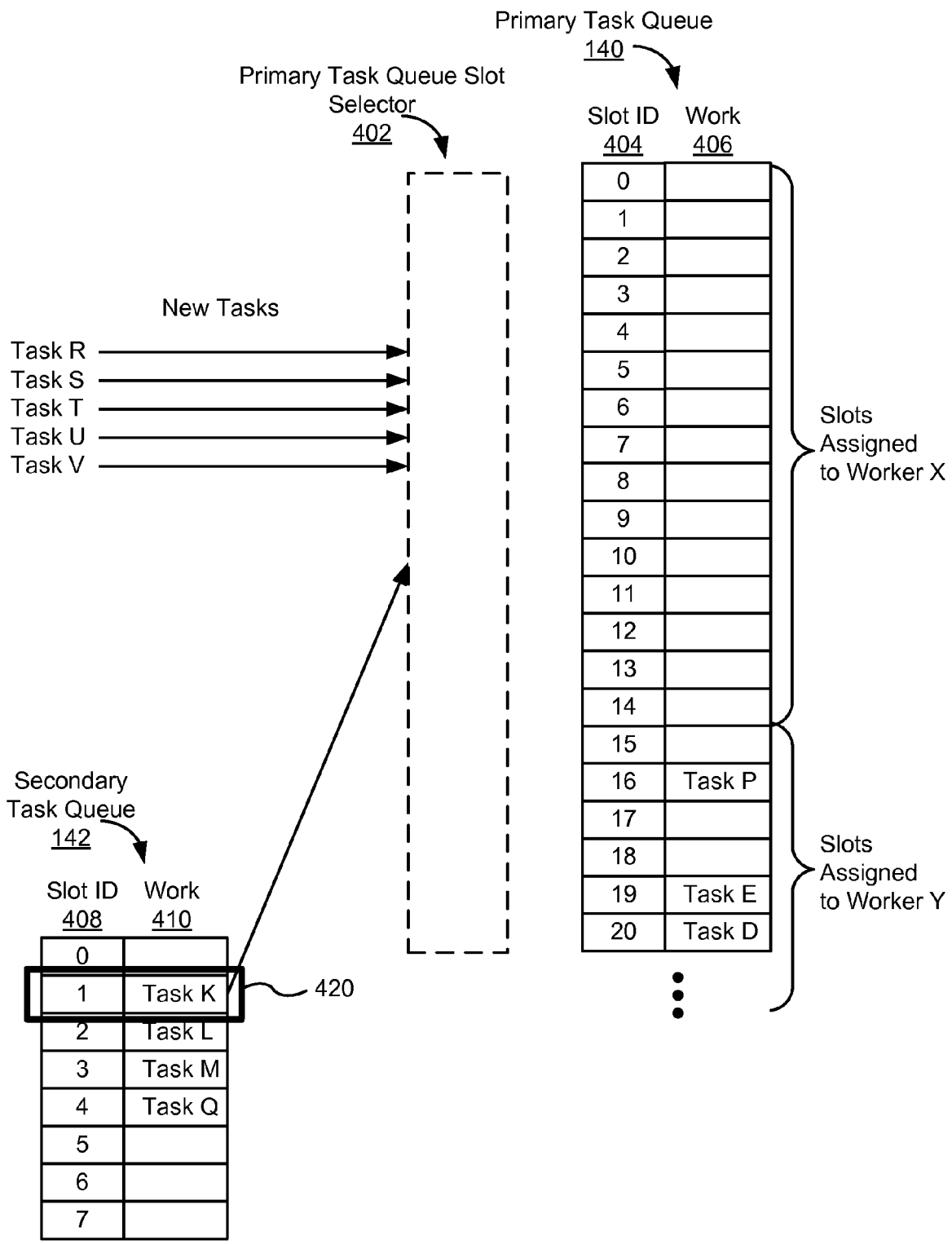

In FIG. 4E tasks P, E and D are still present in Primary Task Queue 140 as they have not yet been retrieved for processing by Worker Y. However, the tasks in the slots of Primary Task Queue 140 that are assigned to Worker X (e.g., tasks A, O, C, I, H, J, B, G, F and N) have been retrieved for processing and/or have been processed by Worker X and thus have been deleted from Primary Task Queue 140, making room in slots 0-14 of Primary Task Queue 140 for new tasks and tasks from Secondary Task Queue 142. New tasks R-V are to be scheduled for processing. Additionally, in the example illustrated in FIG. 4E, some of the slots in Secondary Task Queue 142 are now occupied with tasks K, L, M and Q, and thus Server 106 attempts to place one or more of these tasks (e.g., task K in the exit portion 420 of Secondary Task Queue 142) into Primary Task Queue 140 via Primary Task Queue Slot Selector 402. It should be noted that as Secondary Task Queue 142 is a circular queue, the exit portion 420 will move down through the slots until it reaches a last slot and then start at the first slot. Additionally, additional slots (in this example, slots 6 and 7) have been added to Secondary Task Queue 142 as Secondary Task Queue is starting to run out of slots.

It should be understood that the description of assigning tasks to worker processes via task queues described above is merely exemplary. In some implementations more or fewer tasks, worker processes, queue slots are used. Additionally, the steps may not proceed in the order shown above.

Assignment of Tasks to Worker Processes

FIG. 5 includes a flowchart representing a method 500 for assigning tasks to worker processes in a scalable and efficient manner using a primary task queue, in accordance with some embodiments. Method 500 is, optionally, governed by instructions that are stored in a non-transitory computer readable storage medium and that are executed by one or more processors of one or more computer systems (e.g., Client 102 in FIG. 2 and/or Server 106 in FIG. 3). Each of the operations shown in FIG. 5 may correspond to instructions stored in a computer memory or computer readable storage medium (e.g., memory 206 of Client 102 in FIG. 2 and/or memory 306 of Server 106 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 500 may be combined and/or the order of some operations may be changed.

In some embodiments (e.g., where Client 102 determines an initial candidate slot for a task prior to sending the task to Server 106) Server 106 provides (502) information about a primary task queue 502 to one or more clients. In some embodiments, the information includes (504) a slot-count value indicative of a number of slots in the primary task queue. Additionally, it should be understood that providing the information to a client may include any one or more of: responding to a request for information about the primary task queue, providing Client 102 with an address of a particular location at Sever 106 where the primary task queue information is stored, and/or writing the task queue information to a predefined location at Client 102 (e.g., proactively updating primary task queue information at the clients).

In some embodiments (e.g., where Client 102 determines an initial candidate slot for a task prior to sending the task to Server 106) Client 102 retrieves (506) information about the primary task queue (e.g., a slot-count value) from Server 106. Client 102 generates (508) a request to perform a first task. In some situations the request to perform the first task will be generated in response to a user interaction with a client application. In other situations, the request to perform the first task will be automatically generated by the system without user intervention. In some embodiments, Client 102 (or Primary Task Queue Slot Selector 216 at Client 102, FIG. 2) selects (508) a respective slot (e.g., a candidate slot) in the primary task queue in accordance with a slot-selection function 510 and includes an identifier for the respective slot in the request to perform the first task.

Server 106 receives (512), from Client 102, the request to perform a first task. In some embodiments Server 106 accepts the request unconditionally without regard to whether or not the first task can be inserted at the candidate slot in the primary task queue. In fact, in many circumstances the request is accepted prior to checking whether or not the first task can be inserted in the primary task queue. This enables Client 102 to submit tasks to Server 106 and continue operating under the assumption that the task will eventually be added to the primary task queue and processed by one of the worker processes without needing to receive an explicit confirmation from Server 106.

In some embodiments (e.g., where Client 102 determines an initial candidate slot for a task prior to sending the task to Server 106), the request to perform the first task includes (514) information identifying the respective slot in the primary task queue. In these embodiments, Client 102 assumes part of the processing overhead for managing task assignment by determining an initial candidate slot in the primary task queue where Server 106 will attempt to place the first task. In these embodiments, the method skips directly to determining whether the initial candidate slot in the primary task queue is available.

In some embodiments (e.g., where Client 102 does not determine an initial candidate slot for a task prior to sending the task to Server 106), prior to determining whether the respective slot in the primary task queue is available: the first task is initially inserted (516) at an entry point of the secondary task queue (e.g., a next available slot in circular Secondary Task Queue 142 shown in FIGS. 4A-4E). In these embodiments, when the first task reaches (518) an exit point of the secondary task queue (e.g., because Server 106 has placed or attempted to place all of the prior tasks in the secondary task queue into the primary task queue), Server 106 (or Task Queue Manager 130 of Server 106 in FIG. 3) selects (520) a respective slot (e.g., a candidate slot) in the primary task queue in accordance with the slot-selection function.

In some other embodiments (e.g., where Client 102 does not determine an initial candidate slot for a task prior to sending the task to Server 106 and the first task is not initially placed in the secondary task queue), in response to receiving the request from Client 102 to perform the first task, Server 106 (or Task Queue Manager 130 of Server 106 in FIG. 3), selects (520) a respective slot in the primary task queue in accordance with a slot-selection function without first placing the first task in the secondary task queue.

It should be understood that the respective slot is selected (e.g., either at Server 106 or at Client 102) in accordance with a slot-selection function designed to probabilistically distribute respective target slots for a plurality of successive tasks across a plurality of different non-consecutive slots in the primary task queue. In other words, the primary task queue is a "random access" queue, which is to say that tasks can be placed in and retrieved from arbitrary slots in the primary task queue without disrupting the queue populating and task processing procedures. Consequently, slots in the primary task queue can be dynamically assigned and reassigned to worker processes. Moreover, the primary task queue can be distributed over a number of storage devices at Server 106 without incurring substantial computational overhead, because the worker processes only need to know the location of the slots of the primary task queue for which they are responsible and do not need to be made aware of the location or even the existence of other portions of the primary task queue (e.g., a first worker process responsible for slots 1-100 need only know about the storage device (or logical locations) storing slots 1-100, and a second worker process responsible for slots 101-200 need only know about the storage device (or logical locations) storing slots 101-200, etc.).

It should be noted that given any practical primary queue size (e.g., a primary task queue with more than fifteen slots), a probabilistic slot-selection function will distribute sequential tasks in non-sequential slots in the primary task queue. In other words, the probability of two slots successively selected by the slot-selection function being non-consecutive in the primary task queue is significantly higher than probability of any two slots successively selected by the slot-selection function being consecutive slots in the primary task queue.

In some embodiments, the output of the slot-selection function is based at least in part on a number of slots in the primary task queue. In some of these embodiments, the number of slots in the primary task queue is stored, under control of the server system at a location accessible to a computer system executing the slot-selection function, as a slot-count value. It should be understood that, in some implementations, the slots are database locations with identifiers corresponding to a queue name and an integer value in the range from zero to the slot-count value.

In some embodiments, the slot-count value is varied based at least in part on a number of entries in the secondary task queue. For example, when the secondary task queue is empty, the slot-count value is decreased and when the secondary task queue exceeds or approaches a predefined size (number of entries), the slot-count value is increased. Alternatively, in some embodiments, the slot-count value is a predetermined value that is based on an expected load on the primary task queue. As described above, in some implementations, the slot-count value is used as a parameter in the slot-selection function. Thus, varying the slot-count value based on the number of entries in the secondary task queue would adjust both the number of slots in the primary task queue and the range of slots that could be returned as candidate slots by the slot-selection function.

In some implementations, the slot-selection function is a hash function with a modulus equal to a number of the slots in the primary task queue or a random or pseudo-random number generator with a modulus equal to the number of the slots in the primary task queue. Thus, in these implementations the slot-selection function will have possible output values corresponding to the slot IDs for the slots in the primary task queue. The hash function typically takes a hash of an identifying value that uniquely identifies the task. For example, the identifying value could include a payload of the task or a task ID or both. In some embodiments, the hash function also takes a current time or some random or pseudorandom value as an input so that different candidate slots are tried when Server 106 attempts to place a particular task in the primary task queue multiple times. For example, a first candidate slot for a particular task is occupied when Server 106 first attempts to add the particular task to primary task queue. Subsequently, when a second candidate slot in the primary task queue is selected for the particular at a later time using a hash function that takes a current time or pseudorandom value as an input, the second candidate slot has a very low probability of being the same slot as the first candidate slot. Thus, as shown in FIGS. 4B and 4D the first time that Server 106 attempts to add task J to the primary task queue, slot 12 (which is occupied) is the candidate slot. However, the second time that Server 106 attempts to add task J to the primary task queue, slot 7 (which is unoccupied) is the candidate slot, so that task J is successfully added to the primary task queue on the second attempt, even though the prior candidate slot (e.g., slot 12) is still occupied.

In some embodiments the task ID is an identifier that is unique within the server system. In other embodiments, the task ID is an identifier that is unique with respect to Client 102 but not guaranteed to be unique within Server 106 and thus the identifying value includes the task ID and additional information that distinguishes the task using an identifier of the client submitting the task (e.g., the hash function takes a hash of an identifying value that includes a client ID, a task ID, and optionally, a timestamp).

In any of the embodiments described above, after the respective slot has been identified, Server 106 (or Task Queue Manager 130 of Server 106 in FIG. 3) determines whether the respective slot in a primary task queue having a plurality of slots is available (e.g., unoccupied). In accordance with a determination that the respective slot is unavailable (522), Server 106 inserts (526) the first task at an entry point of a secondary task queue. In contrast, in accordance with a determination that the respective slot is available (524), Server 106 inserts (526) the first task in the respective slot in the primary task queue.

In some embodiments the tasks in the secondary task queue are ordered in causal order (e.g., the tasks are ordered in accordance with an order in which the tasks were received at the server system). Thus, in some embodiments, the secondary task queue generally functions as a first-in-first-out queue, such as a circular queue. However, as successful processing of the tasks does not require precise ordering of performance of the tasks, a strict first-in-first-out queue is not required in some embodiments. In one exemplary embodiment, Server 106 attempts to process tasks in the secondary task queue in first-in-first-out order but tolerates some out of order/repeated execution of tasks. In some embodiments, Server 106 sends task receipt confirmation to the client as a matter of course in a normal request processing flow (e.g., a normal HTTP request flow) without regard to the task queue in which the first task is inserted. In some implementations, at least a subset of the tasks in the primary task queue are assigned to a worker process for processing while Server 106 is in a normal mode of operation. In other words, the primary task queue is for assigning tasks to worker processes, while the secondary task queue is for inserting tasks into slots in the primary task queue.

Server 106 (or Task Queue Manager 130 of Server 106 in FIG. 3) assigns (528) slots in the primary task queue to one or more worker processes to process the tasks in the primary task queue. It should be understood that assigning slots in the primary task queue to worker processes may be performed prior to receiving the request from Client 102 or after receiving the request from Client 102. Additionally, due to the random access nature of the primary task queue, slots in the primary task queue can be assigned or reassigned by Server 106 as needed to distribute tasks across different worker processes so as to account for differences in the speed of processing tasks by different worker processes and different rates at which tasks are assigned to different portions/slots of the primary task queue. Thus, in some embodiments, the first set of slots and the second set of slots are determined (530) based on a rate at which tasks are being assigned to distinct subsets of the slots.

In particular, in some implementations, a first set of slots in the primary task queue are assigned (532) to a first worker process. Subsequently, at a first time, Server 106 makes (534) a first group of two or more tasks in the first set of slots available to the first worker process. In some embodiments, the tasks are known to be conducive to being processed in aggregate (e.g., the tasks correspond to mathematical operations that are commutative and associative) and the first worker process processes all of the tasks in the first group of tasks as a batch. For example, each of the tasks corresponds to the mathematical operation of incrementing a counter by a specified amount (e.g., +1). In this example, instead of incrementing the counter separately for each task, the first worker process adds up all of the specified amounts for all of the tasks to determine an aggregate increment and increments the counter by the aggregate increment in a single operation. This requires many fewer read/write operations than if each of the tasks in the first group of tasks were to be performed individually. In some of these embodiments, at a second time, after the first time, Server 106 receives (536) a batch delete instruction to delete all of the tasks in the first group from the primary task queue and in response to the batch delete instruction, Server 106 deletes (538) all of the tasks in the first group from the primary task queue. In some embodiments, the batch delete instruction is sent by the first worker process when the first worker process has completed processing of the tasks in the first portion. In other embodiments, the batch delete instruction is sent by the first worker process when the first worker process has commenced or undertaken processing of the tasks in the first portion. Alternatively, the first worker process individually deletes tasks as they are performed by the worker process.

In some implementations, a second set of slots in the primary task queue, distinct from the first set of slots are assigned (543) to a second worker process distinct from the first worker process. Subsequently, at a third time, independent of the first time and the second time, Server 106 makes (544) a second group of two or more tasks in the second set of slots available to the second worker process. In some embodiments, at a fourth time, after the third time, Server 106 receives (546) a batch instruction to delete all of the tasks in the second group from the primary task queue and in response to the delete batch instructions, deletes (548) all of the tasks in the second group from the primary task queue. Alternatively, the second worker process individually deletes the tasks as they are performed by the worker process.

In other words, in these embodiments, the first worker process and the second worker process each process tasks from their own portion of the primary task queue and the first and second worker processes are able to process the tasks in their own portion independently of processing of tasks in other portions of the primary task queue. Thus, in these embodiments, the first worker process and the second worker process do not need to be coordinated by Server 106 and do not serve as bottlenecks for each other. In a similar manner, a virtually unlimited number of worker processes could be assigned to different portions of the primary task queue without interfering with worker processes working on other portions of the task queue. Thus, in these implementations, the primary task queue can be scaled efficiently (e.g., without degrading overall performance).

Additionally, Server 106 can optionally dynamically manage the workloads of the worker processes by changing the assignments of slots in the primary task queue in accordance with predefined criteria. Thus, in some embodiments, Server 106 reassigns (550) slots in the primary task queue to one or more worker processes to process the tasks in the primary task queue in accordance with a predefined minimum task processing rate. In particular, in some implementations, Server 106 determines (552) that the first worker process is processing tasks at a rate that is slower than a predefined minimum rate (e.g., either because the worker process is processing tasks slowly or because tasks are being assigned to the first portion of the primary task queue at a rate that is faster than the first worker process can process the tasks). In response to determining that the first worker process is processing tasks too slowly, Server 106 selects (554) a subset of slots from the first set and removes (556) the subset of slots from the first set of slots.

For example, if Server 106 determines that the first worker process is not keeping up with the tasks being assigned to slots in the first set of slots in the primary task queue, Server 106 could divide the first set of slots assigned to the first worker process in half, leaving the first worker process with half of the first set of slots and assigning the other half of the first set of slots to another worker process. Thus, in some embodiments, Server 106 assigns (562) the subset of slots to a second worker process distinct from the first worker process. In some implementations, the process of reassigning slots from one worker process to another worker process is performed "offline" (e.g., while the task assignment process is temporarily paused for maintenance). In some other embodiments, the process of reassigning slots from one worker process to another worker process is performed "online" (e.g., while the task assignment process actively assigning tasks to slots in the primary task queue and tasks are being retrieved from the primary task queue by worker processes). The ability to dynamically reassign slots in the primary task queue while the task assignment process is "online" provides many advantages. In particular, it allows Server 106 to adjust workloads of the worker processes "on the fly" without stopping the task assignment process.

After the tasks have been placed in the primary task queue and retrieved by one or more respective worker processes, Sever 106 receives (560), from the one or more worker processes, processed data corresponding to the tasks in the primary queue. In some embodiments, this data may be stored at a predefined location at Server 106 in conjunction with an identifier of the request that enables Server 106 (or Response Generator 134 of Server 106 in FIG. 3) to generate a response to a request from Client 102 that corresponds to the processed task. Server 106 transmits (562) a response to the client from which the request was received (e.g., Client 102), the response corresponding to at least a subset of the processed data. Client 102 retrieves (564) the processed data corresponding to the first task (e.g., by receiving the response from Server 106). In some circumstances, the processed data can be used by Client 102 to update an application state and/or a user interface of an application which is then displayed to a user of Client 102.

It should be understood that the particular order in which the operations in FIG. 5 have been described are merely exemplary and are not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a respective server system having one or more processors and memory storing one or more programs that when executed by the one or more processors cause the respective server system to perform the method, the method comprising:
receiving, from a client, a request to perform a first task;
determining whether a first slot in a primary task queue having a plurality of slots is available, wherein the first slot was selected in accordance with a slot-selection function designed to probabilistically distribute respective target slots for a plurality of successive tasks across a plurality of different non-consecutive slots in the primary task queue;
in accordance with a determination that the first slot is available, inserting the first task in the first slot in the primary task queue; and
in accordance with a determination that the first slot is unavailable, inserting the first task at an entry point of a secondary task queue.

2. The method of claim 1, wherein:
prior to determining whether the first slot in the primary task queue is available:
the first task is initially inserted at an entry point of the secondary task queue; and
the first slot in the primary task queue is identified when the task reaches an exit point of the secondary task queue.

3. The method of claim 1, wherein the request to perform the first task includes information identifying the first slot in the primary task queue.

4. The method of claim 1, wherein the output of the slot-selection function is based at least in part on a number of slots in the primary task queue.

5. The method of claim 4, wherein the number of slots in the primary task queue is stored, under control of the server system at a location accessible to a computer system executing the slot-selection function, as a slot-count value.

6. The method of claim 5, wherein the slot-count value is varied based at least in part on a number of entries in the secondary task queue.

7. The method of claim 5, wherein the slot-count value is used as a parameter in the slot-selection function.

8. The method of claim 7, further comprising, prior to receiving the request from the client, providing the slot-count value to the client.

9. The method of claim 1, wherein the slot-selection function is a hash function with a modulus equal to a number of the slots in the primary task queue or a random or pseudo-random number generator with a modulus equal to the number of the slots in the primary task queue.

10. The method of claim 1, wherein:
a first set of slots in the primary task queue are assigned to a first worker process; and
the method further comprises:
at a first time, making a first group of two or more tasks in the first set of slots available to the first worker process;
at a second time, after the first time, receiving a batch delete instruction to delete all of the tasks in the first group from the primary task queue; and
in response to the batch delete instruction, deleting all of the tasks in the first group from the primary task queue.

11. The method of claim 10, further comprising:
determining that the first worker process is processing tasks at a rate that is slower than a predefined minimum rate; and
in response to the determining:
selecting a subset of slots from the first set; and
removing the subset of slots from the first set; and
assigning the subset of slots to a respective worker process distinct from the first worker process.

12. The method of claim 10, wherein:
a second set of slots in the primary task queue, distinct from the first set of slots are assigned to a second worker process; and
the method further comprises:
at a third time, independent of the first time and the second time, making a second group of two or more tasks in the second set of slots available to the second worker process;
at a fourth time, after the third time, receiving a batch delete instruction to delete all of the tasks in the second group from the primary task queue; and
in response to the batch delete instructions, deleting all of the tasks in the second group from the primary task queue.

13. The method of claim 12, wherein the first set of slots and the second set of slots are determined based on a rate at which tasks are being assigned to distinct subsets of the slots.

14. A server system, comprising:
one or more processors;
memory; and
one or more programs, wherein the one or more programs are stored in the memory and configured to be executed by the one or more processors, the one or more programs including instructions for:
receiving, from a client, a request to perform a first task;
determining whether a first slot in a primary task queue having a plurality of slots is available, wherein the first slot was selected in accordance with a slot-selection function designed to probabilistically distribute respective target slots for a plurality of successive tasks across a plurality of different non-consecutive slots in the primary task queue;
in accordance with a determination that the first slot is available, inserting the first task in the first slot in the primary task queue; and
in accordance with a determination that the first slot is unavailable, inserting the first task at an entry point of a secondary task queue.

15. The system of claim 14, wherein the output of the slot-selection function is based at least in part on a number of slots in the primary task queue.

16. The system of claim 15, wherein the number of slots in the primary task queue is stored, under control of the server system at a location accessible to a computer system executing the slot-selection function, as a slot-count value.

17. The system of claim 14, wherein the slot-selection function is a hash function with a modulus equal to a number of the slots in the primary task queue or a random or pseudo-random number generator with a modulus equal to the number of the slots in the primary task queue.

18. The system of claim 14, wherein:
a first set of slots in the primary task queue are assigned to a first worker process; and
the one or more programs further comprise instructions for:
at a first time, making a first group of two or more tasks in the first set of slots available to the first worker process;
at a second time, after the first time, receiving a batch delete instruction to delete all of the tasks in the first group from the primary task queue; and
in response to the batch delete instruction, deleting all of the tasks in the first group from the primary task queue.

19. The system of claim 18, the one or more programs further comprise instructions for:
determining that the first worker process is processing tasks at a rate that is slower than a predefined minimum rate; and
in response to the determining:
selecting a subset of slots from the first set; and
removing the subset of slots from the first set; and
assigning the subset of slots to a respective worker process distinct from the first worker process.

20. The system of claim 18, wherein:
a second set of slots in the primary task queue, distinct from the first set of slots are assigned to a second worker process; and
the one or more programs further comprise instructions for:
at a third time, independent of the first time and the second time, making a second group of two or more tasks in the second set of slots available to the second worker process;
at a fourth time, after the third time, receiving a batch delete instruction to delete all of the tasks in the second group from the primary task queue; and
in response to the batch delete instructions, deleting all of the tasks in the second group from the primary task queue.

21. The system of claim 20, wherein the first set of slots and the second set of slots are determined based on a rate at which tasks are being assigned to distinct subsets of the slots.

22. A non-transitory computer readable storage medium storing one or more programs, the one or more programs comprising instructions, which when executed by a computer system with one or more processors, cause the computer system to:
receive, from a client, a request to perform a first task;
determine whether a first slot in a primary task queue having a plurality of slots is available, wherein the first slot was selected in accordance with a slot-selection function designed to probabilistically distribute respective target slots for a plurality of successive tasks across a plurality of different non-consecutive slots in the primary task queue;
in accordance with a determination that the first slot is available, insert the first task in the first slot in the primary task queue; and
in accordance with a determination that the first slot is unavailable, insert the first task at an entry point of a secondary task queue.

23. The non-transitory computer readable storage medium of claim 22, wherein the output of the slot-selection function is based at least in part on a number of slots in the primary task queue.

24. The non-transitory computer readable storage medium of claim 23, wherein the number of slots in the primary task queue is stored, at a location accessible to a computer system executing the slot-selection function, as a slot-count value.

25. The non-transitory computer readable storage medium of claim 22, wherein the slot-selection function is a hash function with a modulus equal to a number of the slots in the primary task queue or a random or pseudo-random number generator with a modulus equal to the number of the slots in the primary task queue.

26. The non-transitory computer readable storage medium of claim 22, wherein:
   a first set of slots in the primary task queue are assigned to a first worker process; and
   the one or more programs further comprise instructions to:
      at a first time, make a first group of two or more tasks in the first set of slots available to the first worker process;
      at a second time, after the first time, receive a batch delete instruction to delete all of the tasks in the first group from the primary task queue; and
      in response to the batch delete instruction, delete all of the tasks in the first group from the primary task queue.

27. The non-transitory computer readable storage medium of claim 26, the one or more programs further comprise instructions to:
   determine that the first worker process is processing tasks at a rate that is slower than a predefined minimum rate; and
   in response to the determining:
      select a subset of slots from the first set; and
      remove the subset of slots from the first set; and
      assign the subset of slots to a respective worker process distinct from the first worker process.

28. The non-transitory computer readable storage medium of claim 26, wherein:
   a second set of slots in the primary task queue, distinct from the first set of slots are assigned to a second worker process; and
   the one or more programs further comprise instructions to:
      at a third time, independent of the first time and the second time, make a second group of two or more tasks in the second set of slots available to the second worker process;
      at a fourth time, after the third time, receive a batch delete instruction to delete all of the tasks in the second group from the primary task queue; and
      in response to the batch delete instructions, delete all of the tasks in the second group from the primary task queue.

29. The non-transitory computer readable storage medium of claim 28, wherein the first set of slots and the second set of slots are determined based on a rate at which tasks are being assigned to distinct subsets of the slots.

* * * * *